(12) United States Patent
Kinnunen et al.

(10) Patent No.: US 7,823,715 B2
(45) Date of Patent: Nov. 2, 2010

(54) BELT CONVEYOR AND PROCESSING APPARATUS

(75) Inventors: Petri Kinnunen, Columbia, SC (US);
Markku Viitasalo, Ruutana (FI); Olavi Kinnunen, Parkano (FI); Tero Majuri, Tampere (FI)

(73) Assignee: Metso Minerals Inc., Helsinki (FI)

( * ) Notice: Subject to any disclaimer, the term of this patent is extended or adjusted under 35 U.S.C. 154(b) by 510 days.

(21) Appl. No.: 11/921,522

(22) PCT Filed: Nov. 30, 2005

(86) PCT No.: PCT/FI2005/050440
§ 371 (c)(1),
(2), (4) Date: Dec. 4, 2007

(87) PCT Pub. No.: WO2006/131587
PCT Pub. Date: Dec. 14, 2006

(65) Prior Publication Data
US 2010/0018835 A1    Jan. 28, 2010

(30) Foreign Application Priority Data
Jun. 6, 2005   (FI) .................................. 20055290
Jun. 30, 2005  (WO) ................ PCT/FI2005/050256

(51) Int. Cl.
*B65G 15/26* (2006.01)
(52) U.S. Cl. ...................... 198/313; 198/812; 198/588; 193/35 TE
(58) Field of Classification Search ................ 198/313, 198/812, 588; 193/35 TE
See application file for complete search history.

(56) References Cited

U.S. PATENT DOCUMENTS

| 3,236,393 A | * | 2/1966 | Girardi | ..................... 198/861.4 |
| 3,244,299 A | * | 4/1966 | Girardi | ..................... 414/523 |
| 3,294,216 A | * | 12/1966 | Girardi | ..................... 198/812 |
| 3,415,924 A |   | 12/1968 | Girardi | |

(Continued)

FOREIGN PATENT DOCUMENTS

DE        38 37 986 A1     5/1990

(Continued)

*Primary Examiner*—Joe Dillon, Jr.
(74) *Attorney, Agent, or Firm*—Oliff & Berridge, PLC

(57) ABSTRACT

A belt conveyor comprising a telescopic frame (1), an endless conveyor belt (9) which is supported by idlers (12) connected to the frame (1), a drawing drum (10), and a tilting drum (11), via which the conveyor belt (9) is arranged to run, and an actuator (14) mounted to the frame (1) for changing the length of the frame (1). The frame of the belt conveyor comprises frame blocks (5a, 5b, 5c, 5d, 5e, 5f, 5g) installed to each other in a slidable manner and a lattice mechanism (20) installed to them in a pivotal manner to effect a change in the length of the belt conveyor as a result of the operation of the actuator (14). The frame blocks (5a, 5b, 5c, 5d, 5e, 5f, 5g) comprise at least one frame pipe (2a, 2b, 2c, 2d, 2e, 2f, 2g, 3a, 3b, 3c, 3d, 3e, 3f, 3g), wherein at least one frame block (5a, 5b, 5c, 5d, 5e, 5f, 5g) comprises a supporting beam (4a, 4b, 4b' 4c, 4d, 4d', 4e, 4f, 4g) connected to at least one frame pipe (2a, 2b, 2c, 2d, 2e, 2f, 2g, 3a, 3b, 3c, 3d, 3e, 3f, 3g).

25 Claims, 8 Drawing Sheets

U.S. PATENT DOCUMENTS

| | | | | |
|---|---|---|---|---|
| 3,596,785 A | * | 8/1971 | Weatherford, Jr. | 198/812 |
| 4,260,053 A | * | 4/1981 | Onodera | 198/812 |
| 4,266,650 A | * | 5/1981 | Patel et al. | 193/35 TE |
| 4,664,579 A | * | 5/1987 | Schedwin | 414/223.01 |
| 4,852,712 A | * | 8/1989 | Best | 193/35 TE |
| 4,860,878 A | * | 8/1989 | Mraz et al. | 198/309 |
| 5,147,025 A | * | 9/1992 | Flippo | 198/782 |
| 5,224,584 A | * | 7/1993 | Best et al. | 198/782 |
| 5,456,347 A | * | 10/1995 | Best et al. | 198/781.06 |
| 5,595,283 A | * | 1/1997 | Whetsel | 198/812 |
| 5,632,371 A | * | 5/1997 | Best et al. | 198/781.1 |
| 5,636,728 A | * | 6/1997 | Best et al. | 198/782 |
| 5,645,158 A | * | 7/1997 | Polka et al. | 198/812 |
| 5,718,325 A | * | 2/1998 | Doster et al. | 198/592 |
| 5,850,903 A | * | 12/1998 | Walters | 198/588 |
| 5,938,004 A | * | 8/1999 | Roberts et al. | 198/812 |
| 6,003,658 A | | 12/1999 | Best et al. | |
| 6,068,111 A | * | 5/2000 | Smith et al. | 198/812 |
| 7,455,173 B1 | * | 11/2008 | Fridman et al. | 198/812 |

FOREIGN PATENT DOCUMENTS

| | | |
|---|---|---|
| DE | 199 57 266 A1 | 5/2001 |
| EP | 0 641 607 A2 | 3/1995 |
| EP | 1 108 661 A1 | 6/2001 |
| GB | 493623 | 10/1938 |
| GB | 867302 | 5/1961 |
| SU | 1093635 A | 5/1984 |
| WO | WO 99/50091 A1 | 10/1999 |
| WO | WO 2004/043835 A1 | 5/2004 |

* cited by examiner

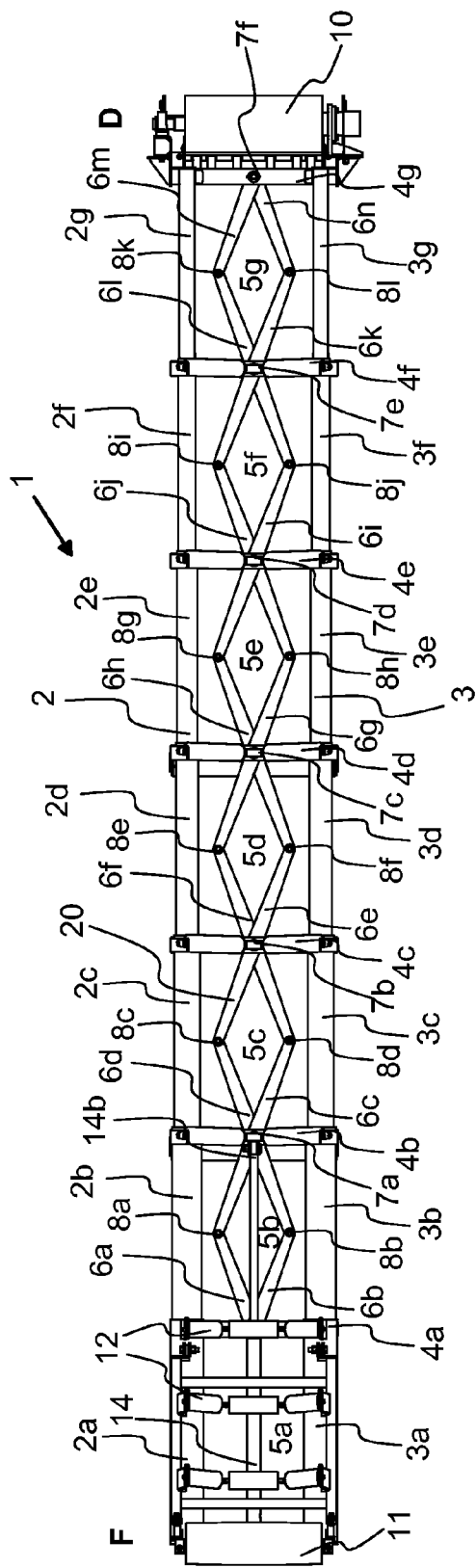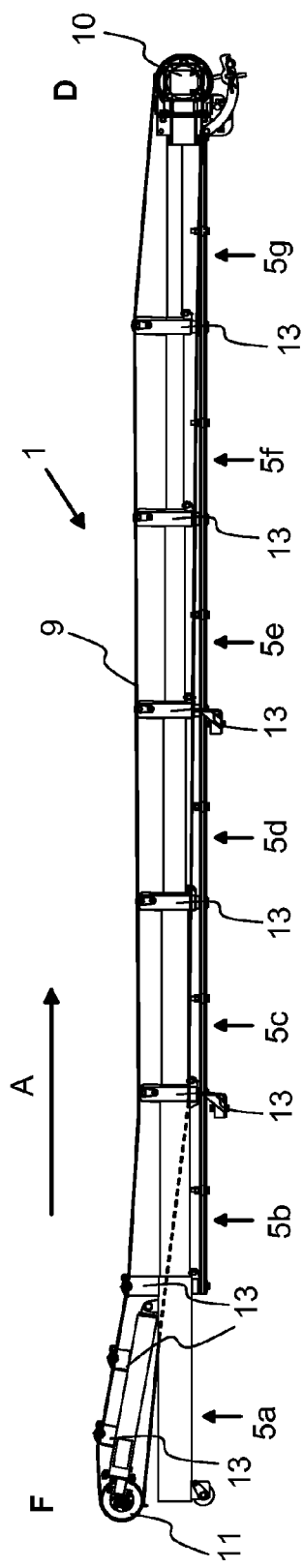
Fig. 1
Fig. 2

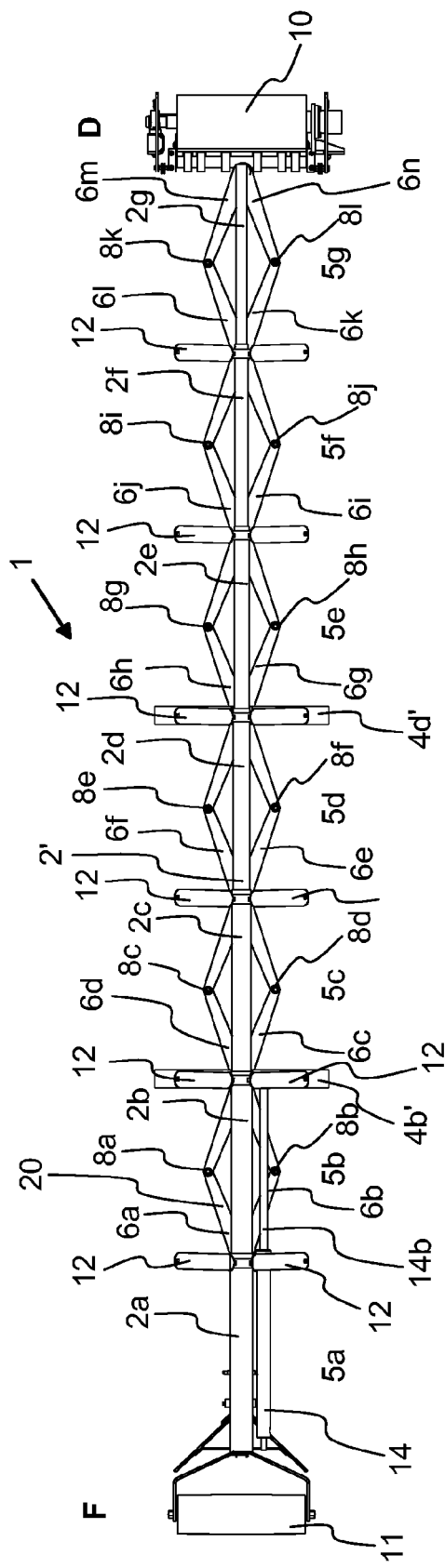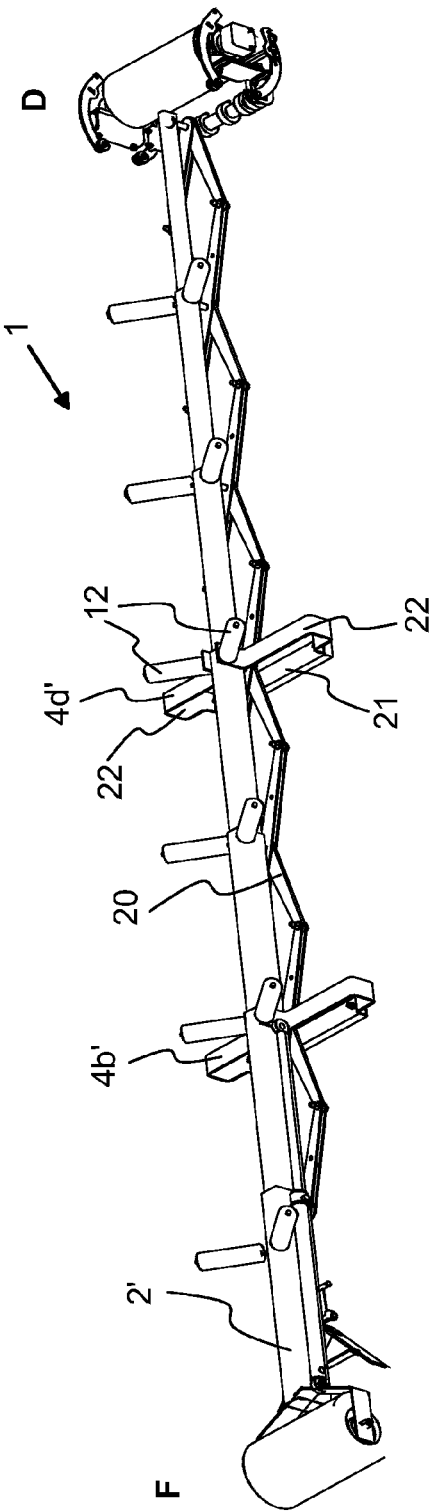
Fig. 10
Fig. 11

BELT CONVEYOR AND PROCESSING APPARATUS

FIELD OF THE INVENTION

The invention relates to a belt conveyor expandable in length.

BACKGROUND OF THE INVENTION

Belt conveyors are commonly used for the transfer of material. The material to be transferred is fed at one end of the belt of the belt conveyor, and when moving forward, the belt transfers the material for the length of the belt conveyor to the other end of the conveyor where the material is discharged from the belt. The lengths of belt conveyors vary according to the required transfer distance of bulk material, ranging from conveyors with a length of less than two meters to conveyors with lengths of even several kilometers.

In certain applications, it is advantageous that the length of the belt conveyor can be made shorter than its working length during its use. For example, during transportation of the belt conveyor from one place to another, it is advantageous that the conveyor can be made shorter to ease the transportation. Particularly when the belt conveyor is connected to a mobile apparatus for the transfer or processing of a material, the possibility of making the belt conveyor shorter is of primary importance, because it enables the flexible transportation of the apparatus to a new location.

Mobile material processing apparatuses are used, for example, for the feeding, transfer, crushing, screening, or washing of mineral materials. Typically, such a processing apparatus comprises a frame and at least one processing unit suitable for the processing of mineral materials, for example a feeder, a belt conveyor, a crusher, a screen, or a corresponding apparatus for transferring, refining or sorting mineral material. Two or more different processing units are often integrated in the same frame to attain an apparatus that is suitable for the versatile processing of mineral material. For the transportation of the apparatus between different working sites or at least within one working site, the frame of the processing apparatus is equipped with runners, wheels or tracks. In many cases, mineral material processing apparatuses are also provided with an independent power source, for example a diesel engine, for moving the apparatus.

There are various solutions of prior art for changing the length of the belt conveyor to the transport position and to the work position again. The essence in these solutions is the method of varying the length of the frame of the belt conveyor. One such solution is to use a telescopic frame construction with pipes which can be placed within each other, so-called slide pipes. The slide pipes have a rectangular cross-section. The frame construction has the shape of a ladder, where the telescopic frame beams of the conveyor consist of slide pipes, between which supporting beams are mounted at both ends at a straight angle to the frame beams. Idlers supporting the conveyor belt from below are mounted on the supporting beams. The shifting of the conveyor to its work position is effected by one or more hydraulic cylinders which are connected, at one end, to the end of the conveyor mounted on the frame of the processing apparatus, and at the other end to the outermost supporting beam of the discharge end of the conveyor. The hydraulic cylinder always extends the conveyor to its full length, and the piston stroke of the cylinder thus determines the length of the conveyor in its work position. In the work position, extended in the full length, the slide pipes carry the weight of the conveyor, and the cylinders take care of the extension of the conveyor. For the tensioning of the conveyor belt, separate belt tensioning means are installed in the frame of the conveyor.

A problem with belt conveyors of the above-described kind is that they are short, having a maximum length of about four meters only. The length of the conveyors is limited by the length and the price of the conveyor extending cylinders.

The frame of the conveyor in mobile mineral material processing apparatuses can also be made of frame blocks connected to each other. Various turning members are installed at the joints. For moving the processing apparatus, the frame blocks of the conveyor are turned to a transport position by means of the turning members.

Document EP 641 607 discloses one such mobile mineral material processing apparatus, in which the belt conveyors which transfer the material from a processing apparatus, for example a screen, and which are, in their work position, extended to the side of the apparatus, are turned onto the top and along the sides of the processing apparatus when the apparatus is prepared for the transport position. For this purpose, the belt conveyor frames are equipped with joints between the frame blocks.

A problem with such turnable belt conveyors is that the preparation of the conveyors to the transport position is cumbersome and time-consuming. Furthermore, in some cases it may require that the operator of the processing apparatus climbs onto the processing apparatus when the conveyor is being turned, which involves the risk of falling of the operator. Another problem is the transport width and height of such processing apparatus and belt conveyors, which may be so great that it is impossible to transfer the combination under narrow transport conditions.

For transferring material, separate conveyor units are also used, which are mobile on transport platforms of their own by means of wheels or rollers, and are provided with belt conveyors intended for the transfer of material only. These conveyor units are moved to the vicinity of the processing apparatus, and they transfer material that comes either directly from the processing apparatus or from a first conveyor arranged in the same frame with the same. Such conveyor units are disclosed, for example, in publications EP 1108661 and WO 99/50091, in which the conveyors can be extended to a work position and shortened for the transport of the conveyor unit. The frame construction of the conveyors is telescopic, wherein for transferring to the transport position, at least a part of the length of the conveyor can be shortened into the structure of the conveyor. The telescopic frame construction of the conveyor consists of a welded and folded profile and has a substantially rectangular cross-section.

These belt conveyors, whose frame construction is made of telescopic parts with a primarily rectangular cross-section, are difficult and expensive to manufacture. The chamfering of the profiles is labour and time consuming. It is particularly cumbersome to manufacture the frame parts sliding in each other with accurate clearances, because in the solutions presented in the prior art publications, the length of the telescopic frame parts is relatively long and the clearances must be held constant over the whole length of the frame part.

BRIEF DESCRIPTION OF THE INVENTION

It is thus an aim of the present invention to provide a belt conveyor and a processing apparatus which overcome the above-mentioned problems and in which the total length of the belt conveyor, when extended to its work position, is significantly greater than in apparatuses of prior art.

The invention is based on the idea that the frame of the belt conveyor is substantially telescopic and it consists of frame blocks slidingly connected to each other, and a lattice mechanism connected to the frame blocks. The frame blocks consist of at least one pipe extending in the longitudinal direction of the block, a so-called frame pipe. At least one frame block is provided with a supporting beam which is connected to at least one frame pipe of the respective frame block. The frame of the conveyor consists of several frame blocks, and the diameters of their frame pipes diminish gradually towards the discharge end of the conveyor. In this way, the frame blocks can slide telescopically into each other. When the frame is extended to its full size, the frame blocks with their supporting beams constitute a ladder-like structure. The frame blocks are further provided with a lattice mechanism consisting of lever arms which are articulated, at both ends, to each other and, at their substantial center section between the ends, to the supporting beams.

According to one embodiment of the invention, the frame blocks consist of two frame pipes and a supporting beam mounted between the pipes. Thus, the pipes forming one frame block are equal in diameter. According to another embodiment of the invention, the frame blocks comprise only one frame pipe. In this embodiment, at least one frame block comprises a supporting beam connected to the frame pipe of the respective frame block.

For varying the length of the frame and thereby also the conveyor, an actuator is mounted on one end of the frame, which actuator may be any actuator suitable for the purpose, for example a hydraulic cylinder, a screw hoist, or an actuator with a gear, chain or cable transmission. Preferably, the actuator is mounted at the feed end of the frame, wherein one end of the actuator is mounted on the end beam of the first frame block, seen from the feed end, or on the frame of the processing apparatus. The other end of the actuator is mounted on the supporting beam of one frame block following the first frame block, seen from the feed end.

The telescopic frame can be extended and shortened by means of the movement of the actuator. When the frame is in the transport position, i.e. shortened, the frame blocks are placed within each other, and the lattice mechanism is collapsed. By a movement of the actuator, the lattice mechanism is released to push the frame blocks farther away from the frame of the processing apparatus and to make them slide outwards.

The structure of the frame of the belt conveyor thus consists of various functional parts, each with a particular function. The telescopic beams of the frame blocks, consisting of the frame pipes, carry the weight of the frame construction and the material to be conveyed on the belt, and create the length of the frame. The supporting beams reinforce the structure and support the idlers which support the belt of the conveyor. The lattice structure is effective when the length of the frame is changed and provides a change in the length. Furthermore, the lattice structure sustains the forces caused by the tensioning of the belt.

It is an advantage of the invention that the length of the frame of the belt conveyor and thereby the total length of the belt conveyor can be changed simply and quickly. The extension and shortening of the frame is effected by the actuator. When a hydraulic cylinder is used, only one stroke of the cylinder is required to change the length. When it is necessary to change the length of the belt conveyor, for example from the transport position to the work position, it is sufficient that the operator starts the hydraulic cylinder, any other measures or devices, such as hoists, will not be needed. It is equally simple and easy to shorten the conveyor. When the conveyor is shortened, the frame of the conveyor is not folded in any way, wherein no lifting or other devices will be needed for arranging the frame blocks onto the frame of the processing apparatus.

Furthermore, the belt conveyor according to the invention can be constructed in such a way that when extended to the work position, it is significantly longer than the belt conveyors of prior art. This can be easily implemented by adding frame blocks and lever arms in the frame and in the lattice mechanism, respectively. Thus, by the conveyor according to the invention, material can be transferred considerably farther away from the material feeding point or the processing apparatus than by apparatuses of prior art. Thanks to the extension of the conveyor, it is also possible to increase the discharge height of the conveyor. The telescopic pipe beams of the conveyor resist the load, to which they are exposed, better than the arrangements of prior art, wherein more frame blocks can be installed, one after the other, and the conveyor can be made longer than the arrangements of prior art.

Furthermore, when shortened to the transport position, the belt conveyor according to the invention is considerably shorter than the belt conveyors of prior art, which makes it easier to move the conveyor or the processing apparatus, to which the conveyor is installed, from one place to another. The first frame block at the feed end of the conveyor can be installed, for example, on top of the frame of the mobile processing apparatus, partly inside the structure of the processing apparatus, which further reduces the length of the conveyor extending outside the walls of the processing apparatus in the transport position.

Moreover, when the conveyor is in the work position, the tensioning of the conveyor belt can be performed by means of the telescopic frame, and no separate belt tensioning devices will be needed.

A particularly great advantage of the invention is achieved when it is installed in a mobile material processing apparatus. Thus, when the processing apparatus is moved from one worksite to another, the conveyor can be quickly shortened to the transport position and extended to the work position. Advantageously, the conveyor is mounted on the frame of the mobile processing apparatus in such a way that a part of the frame of the conveyor is placed underneath or inside the processing apparatus. Thus, the part of the conveyor that remains outside the outer dimensions of the processing apparatus is short and does not disturb the moving of the processing apparatus.

Furthermore, the belt conveyor according to the invention is cheap and simple to manufacture. If frame pipes with an annular cross-section are used in the frame blocks, they can be purchased ready-made, without a need to chamfer the slide pipes, which requires accuracy and is time consuming. The other parts used in the frame are also easily accessible. Furthermore, the assembly of the frame, primarily by welding, is easy and fast.

BRIEF DESCRIPTION OF THE DRAWINGS

In the following, the invention will be described in more detail with reference to the appended drawings, in which FIG. 1 shows schematically one belt conveyor according to the invention in its work position, seen from above, FIG. 2 shows the frame of the belt conveyor of FIG. 1, seen from the side, FIG. 10 shows schematically another belt conveyor according to the invention in its work position, seen from above, FIG. 11 shows the belt conveyor of FIG. 10 in a perspective view.

In FIGS. 1 to 13, the same numerals refer to corresponding parts, and they will not be explained separately later on, unless required by the illustration of the subject matter.

DETAILED DESCRIPTION OF THE INVENTION

Figure 3:
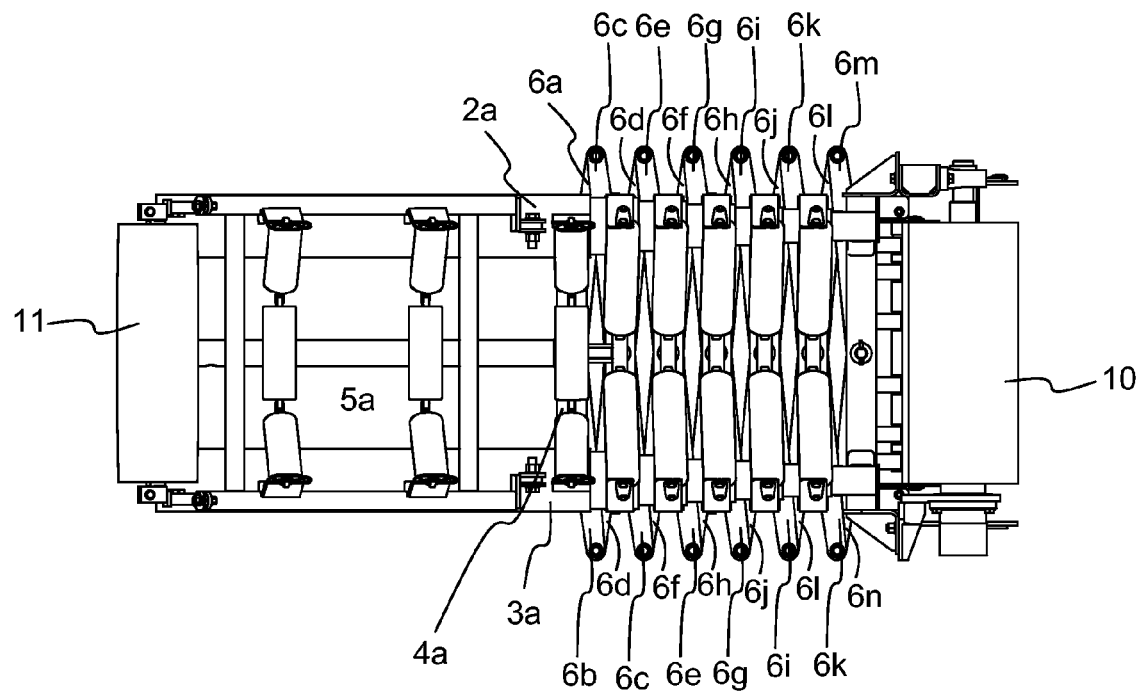
FIG. 3 shows the frame of the belt conveyor of FIG. 1 in its transport position, seen from above.

In this application, material refers to any material that can be conveyed by a belt conveyor, such as mineral material, concrete, and wood material, such as sawdust or wood chips. The mineral material, in turn, refers to any material that contains minerals, such as soil, coal, ore, broken rock or gravel, various recyclable construction waste, such as concrete, tile, or asphalt.

FIG. 1 shows the frame 1 of a belt conveyor according to the invention extended into its full length, i.e. in its work position. The frame 1 consists of seven frame blocks 5a-5g. Each of the frame blocks 5a-5g consists of two frame pipes extending in the longitudinal direction of the block, and a supporting beam mounted between the pipes. For example, the frame block 5f consists of frame pipes 2f and 3f and a supporting beam 4f. In one frame block, the frame pipes are equally long seamless pipes having an annular cross-section and a diameter that is substantially constant from one end of the pipe to the other. The length of the frame pipes may vary, for example, from 700 to 1400 mm, but also other lengths are possible. The length of the frame pipes is determined by the width of the belt of the conveyor. That is to say, the conveyor belt is supported by means of idler assemblies mounted on the supporting beams of the frame blocks as will be described below in this application. However, in the frame blocks next to each other, the diameter of the frame pipes diminishes in such a way that they can be slided into and out of each other. That is, the frame blocks are installed one after the other in such a way that the first frame block, in which the diameter of the frame pipes is smaller, is capable of sliding into the second frame block, in which the diameter of the frame pipes is greater. In this way, the frame pipes 2a-2g and 3a-3g constitute so-called telescopic beams 2 and 3, whose length is increased when the pipes 2a-2g and 3a-3g slide outwards. In a corresponding manner, the length of the beams is reduced when the pipes slide into each other. Thus, it can be said that the frame 1 is a telescopic frame whose frame blocks are slidably mounted on each other. The diameter of the frame pipes 2a-2g and 3a-3g diminishes towards the discharge end D of the conveyor. Thus, the pipes 2a and 3a with the largest diameter are at the feed end F of the conveyor. The feed end F of the conveyor refers to that end of the conveyor which receives the material to be transferred by the conveyor onto the belt, and the discharge end D of the conveyor refers to that end of the conveyor from which the transferred material is discharged from the belt. The inner surface of the frame pipes 2a-2f and 3a-3f, at the ends on the side of the discharge end, is provided with means which are abutted by counterparts provided on the outer surface of the frame pipes 2b-2g and 3b-3g, at the end of the feed end, when the conveyor is extended, thereby preventing the sliding of the frame pipes completely out of each other.

The frame pipes 2a-2g and 3a-3g of the frame blocks are connected to each other with supporting beams 4a-4g of substantially equal length, which have been welded between the frame pipes 2a-2g and 3a-3g at a straight angle to the beams in such a way that each pipe 2a-2g in the pipe beam 2 is connected to a pipe 3a-3g with a corresponding diameter in the pipe beam 3. The supporting beams 4a-4g are welded to that end of the pipes which is closest to the discharge end D of the conveyor, substantially at the same location along the length of the pipes. The length of the supporting beams is determined according to the desired width of the conveyor.

The length of the supporting beams may also vary. The length of the supporting beams is not very significant, if they are connected to the upper or lower surfaces of the frame pipes 2a-2g and 3a-3g. However, if the supporting beams 4a-4g are connected to the inner or outer surfaces of the frame pipes, the supporting beams 4a-4g must have different lengths graded in such a way that the central axes of the frame pipes 2a-2g of two successive frame blocks 5a-5g, as well as those of the frame pipes 3a-3g, must be substantially parallel and equidistant from each other in such a way that the frame pipes 2a-2g and 3a-3g of each two successive frame blocks 5a-5g can slide into each other.

Two elongated lever arms 6a-6n with equal lengths are connected to each supporting beam 4a-4g, substantially at the center of their length. The lever arms are made of, for example, flat bar iron, or they are cut from a sheet by flame cutting, and bores are provided at their both ends and at the center of the length. The lever arms are connected to the supporting beam by a supporting means 7a-7f. The supporting means may be, for example, a hinge pin that extends through holes in the center of two lever arms placed on top of each other in such a way that the lever arms can move in a scissors-like way pivotably around the hinge pin. Thus, each frame block comprises two lever arms. Further, the lever arms of two successive frame blocks are articulated to each other by joints 8a-8l at their ends in such a way that they can pivot in relation to each other. As can be seen from FIG. 1, the lever arms constitute a lattice mechanism 20. For example, in the frame block 5f, a supporting means 7e is installed in the center of the supporting beam 4f, and lever arms 6k and 6l are installed to pivot in the horizontal direction in relation to the supporting means 7e. The lever arm 6k is, at its one end, connected by means of the joint 8i to the lever arm 6j of the frame block 5e, and at its other end, by means of the joint 8l to the lever arm 6n of the frame block 5g. The lever arm 6l, in turn, is connected, at its one end, by means of the joint 8j to the lever arm 6i of the frame block 5e, and at its other end, by means of the joint 8k to the lever arm 6m of the frame block 5g. The joints 8a-8l allow the turning movement of the lever arms in the horizontal level.

The lever arms have equal lengths, except for the frame blocks at the ends of the conveyor frame; in other words, the lever arms 6a and 6b in the first frame block 5a as well as the lever arms 6m and 6n in the last frame block 5g are shorter than the lever arms in the other frame blocks, i.e. their length is only about a half of the length of the lever arms in the other blocks.

Naturally, the belt conveyor also comprises a conveyor belt 9 for conveying the material from the feed end F to the discharge end D of the conveyor. The belt 9 is shown in FIG. 2. The belt 9 is an endless loop made of a flexible material, for example synthetic rubber, and passed through two drums: a drawing drum 10 and a tilting drum 11. At each drum, the belt 9 is turned to run in the opposite direction. The drawing drum 10 is mounted on the frame 1 of the belt conveyor, at its discharge end D. The drawing drum 10 is coupled to actuators (not shown in the figure) for rotating the drawing drum 10 around its shaft. The tilting drum 11 is installed in the frame 1 of the conveyor, at its feed end F. If necessary, the tilting drum can also be equipped with actuators.

The conveyor belt 9 is supported under the belt when it moves in the work position. For this purpose, idlers 12 which rotate freely around their shafts and which are in contact with the belt 9 are connected to the frame 1. The idlers 12 are visible in FIGS. 1, 3, 5, 10, 11, and 12. Seen from the feed end F of the frame, the first frame block 5a comprises three idler assemblies consisting of three idlers 12 and extending over the width of the frame block. One of these idler assemblies is mounted substantially on top of the supporting beam 4a of the frame block 5a, and the two others are mounted at equal distances in relation to the length of the frame pipes 2a and 3a of the frame block 5a. In the other frame blocks 5b-5f, the idler assemblies consist of two idlers 12, and they are also mounted substantially on top of the supporting beams 4b-4f of the respective frame blocks. The frame block closest to the discharge end D does not have idlers 12. The idler assemblies are supported to the frame by means of brackets 13. The supporting of the conveyor belt by idlers, the placement of the idlers, and the methods for mounting them are obvious as such for a person skilled in the art, and they will thus not be described in more detail in this context.

For changing the length of the frame 1, i.e. for making it longer and shorter, the frame 1 is provided with an actuator 14, for example a hydraulic cylinder. The hydraulic cylinder 14 is installed in the longitudinal direction of the frame in such a way that the rear end of its cylinder sleeve is mounted to the end beam (not shown in the figure) of the frame block 5a, and the other end 14b, i.e. the end of the piston rod of the hydraulic cylinder, is mounted to the supporting beam 7a of the second frame block 5b. The piston stroke of the hydraulic cylinder may be slightly shorter than the length of the pipes 2a-2g of the frame blocks 5a-5g, because the pipes remain slightly within each other after the stroke. The stroke of the hydraulic cylinder may be, for example, about 200 mm shorter than the pipes in the frame blocks.

The actuator 14 can also be installed between the end beam of the first frame block 5a and the supporting beam 4c-4g of another frame block 5c-5g fitted to be mobile in relation to the first end beam. Furthermore, instead of the first frame block 5a, one end of the actuator can be connected to a part of the processing apparatus which is substantially immobile in relation to the first frame block 5a, for example the frame 103 of the processing apparatus.

Figure 4:
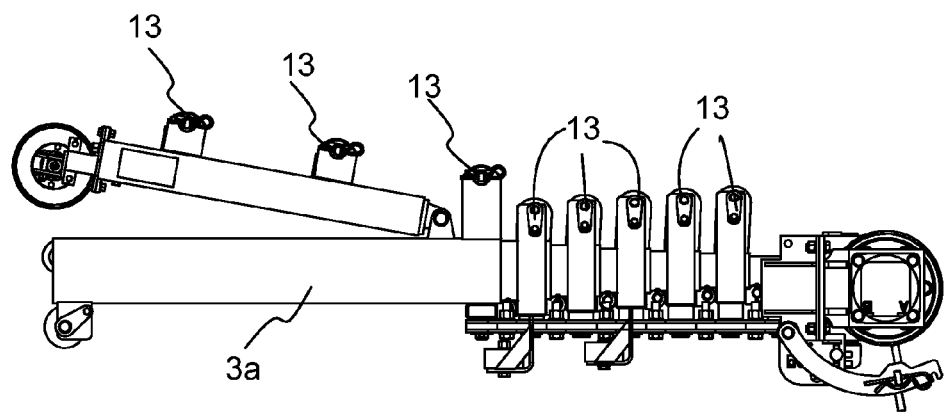
FIG. 4 shows the frame of the belt conveyor of FIG. 3, seen from the side.
Figure 5:
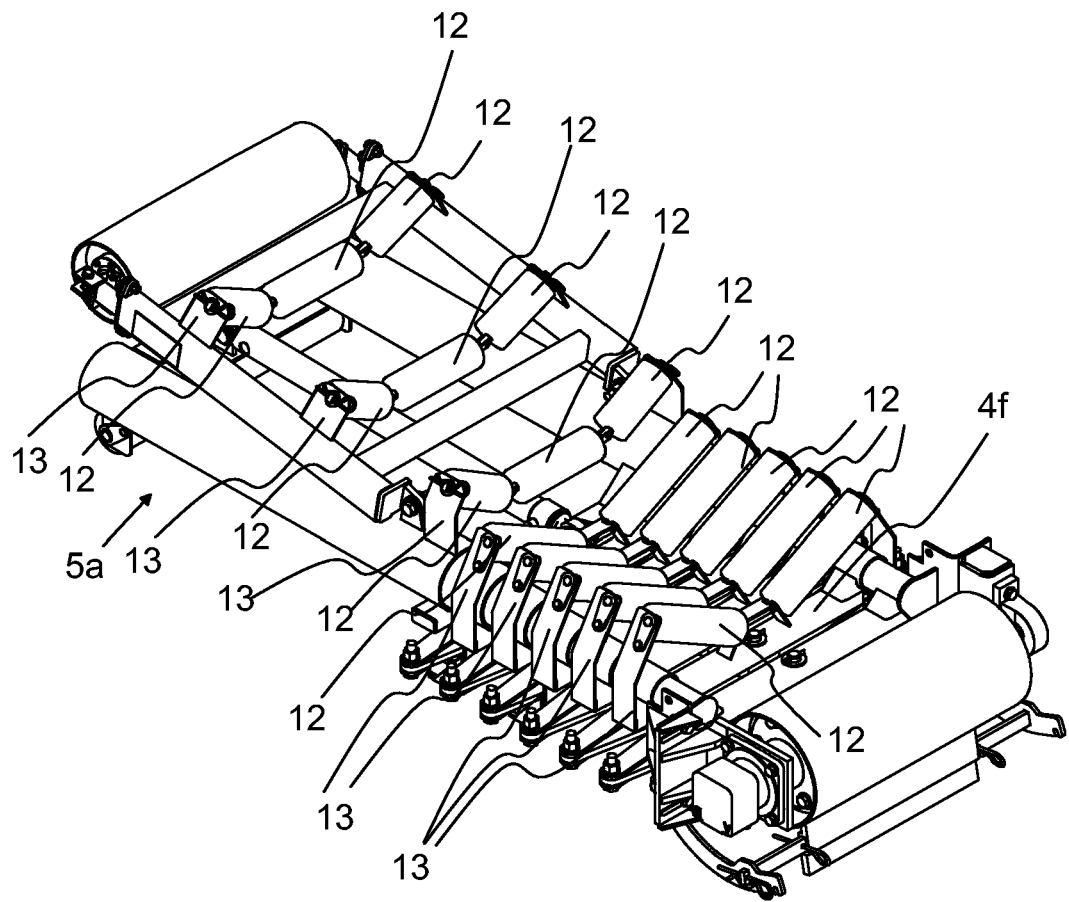
FIG. 5 shows the frame of the belt conveyor of FIG. 3 in a perspective view.

FIGS. 3 to 5 show the frame of the belt conveyor according to the invention in the transport position, that is, contracted to be as short as possible. The frame blocks 5a-5g are within each other; that is, the frame pipes 2b-2g belonging to the frame blocks 5b-5g, and the frame pipes 3b-3g respectively, have slided into the pipes 2a and 3a of the frame block 5a. The piston arm of the hydraulic cylinder 14 has slided into the cylinder sleeve of the hydraulic cylinder. The lever arms 6a-6n have pivoted in relation to the supporting means 7a-7f and the joints 8a-8l, and the lattice mechanism has collapsed.

To extend the belt conveyor, for example, to the work position shown in FIGS. 1 and 2, the hydraulic cylinder is started, and by the effect of the piston stroke of the cylinder, the frame pipes 2b and 3b of the frame block 5b slide out of the frame pipes 2a and 3a of the frame block 5a. By the movement of the piston in the cylinder, the lever arms 6a-6n are also extended, causing also the other frame blocks 5c-5g to slide telescopically out of each other and to make the frame 1 longer. The lattice mechanism formed by the lever arms thus provides an extension of the frame. The lever arms also sustain the forces caused by the tensioning of the conveyor belt. After the frame has been extended, the pipe beams 2 and 3 together with the supporting beams carry the weight of the frame. The belt of the belt conveyor, which has a single length, is discharged to its full length from a belt container (not shown in the figure) installed under the conveyor, for example at its feed end F. The belt can also be lifted or folded, for example onto the conveyor, for the time of transportation.

When the frame is to be contracted to the transport position again, the piston of the hydraulic cylinder slides into the cylinder sleeve and causes sliding of the frame pipes of the frame block 5b into the frame pipes of the frame block 5a and collapsing of the lattice mechanism formed by the lever arms 6a-6g. The scissors-like movement of the lever arms makes the frame pipes of the frame blocks slide into each other and the length of the conveyor to shorten to the transport position. The belt 9 of the conveyor is rewound or folded into the belt container by rewinding or folding means installed in connection with the same.

FIGS. 1 and 2 show the frame of the conveyor extended to its full length, wherein each frame block has slided out substantially the full length of the frame pipes. Also, the conveyor belt has been extended to its full length. For tensioning such a conveyor belt, no separate belt tensioning means will be necessary, because the belt will extend to its full length when the frame is extended. It is also possible to extend the conveyor only to a desired length, wherein the conveyor is dimensioned for various uses according to their needs. The possibility of adjusting the length provides more flexibility in the use of the conveyor. The extension to a fixed length is performed by adjusting the piston stroke of the actuator, for example the hydraulic cylinder.

Figure 6:
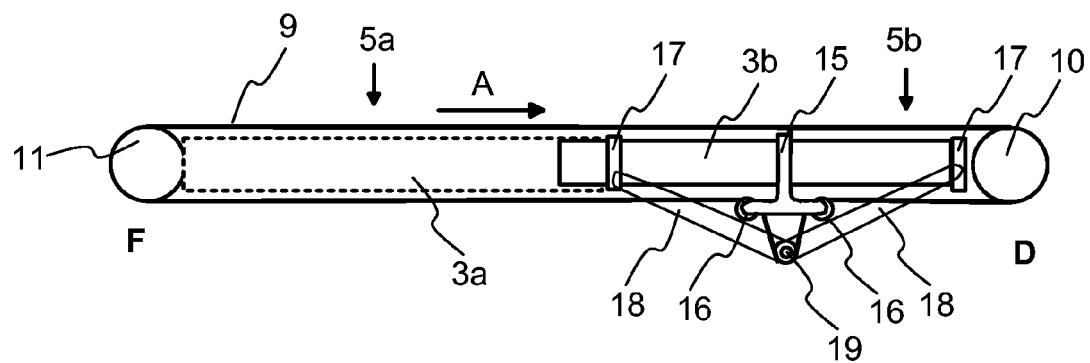
FIG. 6 shows schematically a tensioning arrangement for the conveyor belt when the conveyor is in the work position, seen from the side.
Figure 7:
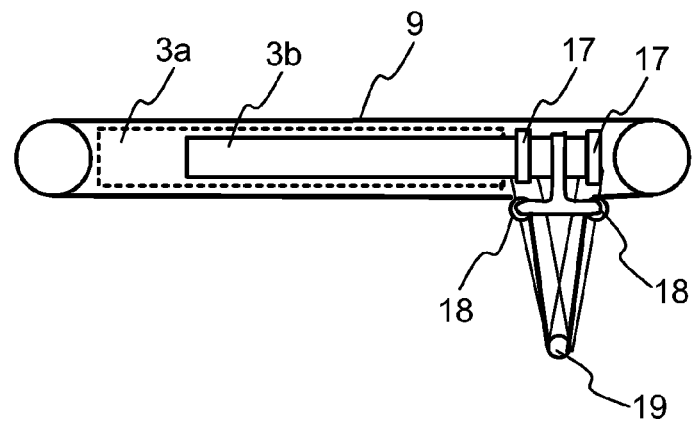
FIG. 7 shows the tensioning arrangement for a conveyor belt according to FIG. 6, when the conveyor is in the transport position.

When the conveyor is extended to a fixed length only, separate tensioning means are needed for tensioning the belt. There may be one or more separate tensioning means, and they may be installed in connection with each frame block or in only certain frame blocks. FIGS. 6 and 7 show one alternative for the means for tensioning the belt in schematic and simplified views. FIG. 6 shows a conveyor belt comprising, for the sake of clarity, only two frame blocks 5a and 5b. Naturally, the presented principle of tensioning the belt can also be implemented in a conveyor whose frame comprises more frame blocks. The diameter of the frame pipes 3a and 2a of the frame block 5a is greater than the diameter of the frame pipes 3b and 2b of the frame block 5b. For tensioning the belt 9, on both sides of the frame block 5b consisting of the frame pipes with the smaller diameter, outside the frame block, the frame is provided with a slidably mounted idler bracket 15 having two idlers 16 connected thereto and extending over the width of the frame. Fixed slide parts 17 are welded to the ends of the frame pipes 3a and 3b of the frame blocks 5a and 5b (and correspondingly also to the ends of the frame pipes 2a and 2b on the other side of said frame block) on the side of the discharge end D. Lever arms 18 of equal length are articulated to these slide parts 17. The lever arms 18 are articulated to the end of an idler 19 installed at their one end, extending over the width of the frame. When the conveyor is in the work position and the frame is extended to the fixed length, the slide parts 17 fall in a certain position according to the position of the frame block 5b, and the lever arms 18 lift the idler connected to them upwards, towards the frame block 5b. The conveyor belt is tensioned to a sufficient extent when it passes, in the direction of the arrow A, via the rim of the drawing drum 10 to the rim of the first idler 16 and from there to the idler 19 and further to the second idler 16 and towards the tilting drum 11.

When the conveyor is contracted to the transport position, which is shown in FIG. 7, the frame blocks 5a and 5b and their frame pipes 3a and 2a as well as 3b and 2b have slid within each other, wherein the slide parts 17 have also slid closer to each other. The lever arms 18 have pressed the idler 19 down to tension the belt 9.

Figure 8:
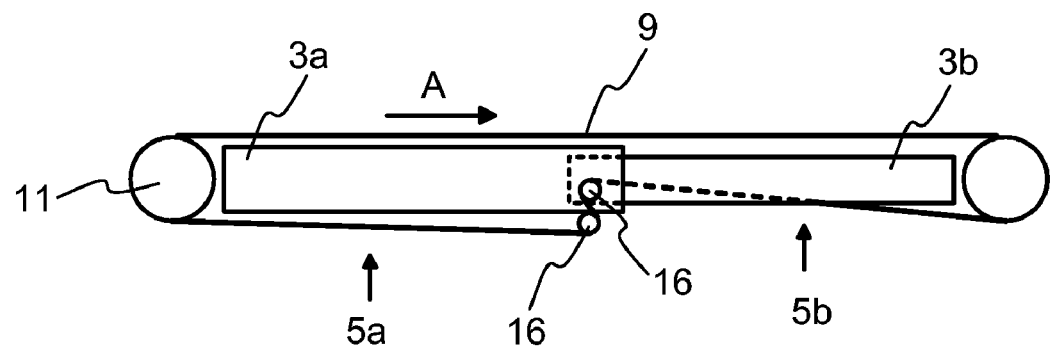
FIG. 8 shows schematically another tensioning arrangement for a conveyor belt when the conveyor is in the work position, seen from the side.
Figure 9:
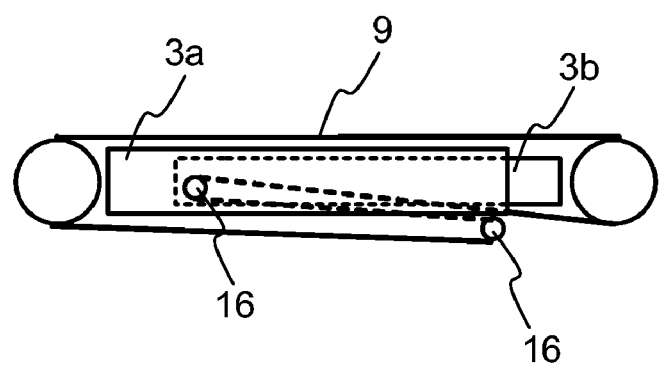
FIG. 9 shows the tensioning arrangement for the conveyor belt according to FIG. 8, when the conveyor is in the transport position.

FIGS. 8 and 9 show another arrangement for tensioning the conveyor belt. An idler 16 extending over the inner width of the frame block 5b is installed inside the frame block, between the frame pipes, at their ends on the side of the feed end. Another idler 16 extending over the width of the frame block is installed under the frame pipes 3a and 2a of the frame block 5a, at their end on the side of the discharge end. The conveyor belt passes via the rim of the drawing drum to the idlers 16 and via them to the tilting drum 11. When the conveyor has been set up to its full length, which is shown in FIG. 8, the idlers 16 have sided with the frame pipes to be substantially on top of each other. Shortened to a fixed length, which alternative is shown in FIG. 9, the frame blocks 5a and 5b have slid within each other, and the idlers 16 have slid with them, simultaneously tensioning the conveyor belt 9.

FIG. 10 shows the frame 1 of another belt conveyor according to the invention extended to its full length. The frame 1 consists of seven frame blocks 5a-5g. Each frame block 5a-5g consists of one frame pipe 2a-2g extending in the longitudinal direction of the block, which frame pipes are substantially identical with those presented in the embodiment of the invention shown in FIG. 1. In the frame blocks following each other, the diameter of the frame pipe diminishes in such a way that they can be slid into and out of each other. In other words, the frame blocks are installed one after the other in such a way that the first frame block, in which the diameter of the frame pipe is smaller, is capable of sliding into the second frame block, in which the diameter of the frame pipes is greater. In this way, the frame pipes 2a-2g constitute a so-called telescopic beam 2'. Thus, also in this embodiment, the frame 1 is a telescopic frame whose frame blocks are slidably mounted to each other. The diameter of the frame pipes 2a-2g diminishes towards the discharge end D of the conveyor so that the pipe 2a with the largest diameter is at the feed end F of the conveyor.

Two lever arms 6a-6n are connected to each frame pipe 2a-2g, at their end closest to the discharge end D of the conveyor. The lever arms are substantially identical to those shown in the embodiment of the invention in FIG. 1, and they are also articulated to each other by means of joints 8a-8l as shown in the embodiment of the invention in FIG. 1. The lever arms are connected by supporting means (not shown in the figure) to the lower surface of the frame pipes 2a-2g. Also in this embodiment, the supporting means may be, for example, a hinge pin that extends through holes in the center of two lever arms placed on top of each other in such a way that the lever arms can move like scissors around the hinge pin. In this way, the lever arms constitute a lattice mechanism 20.

Figure 12:
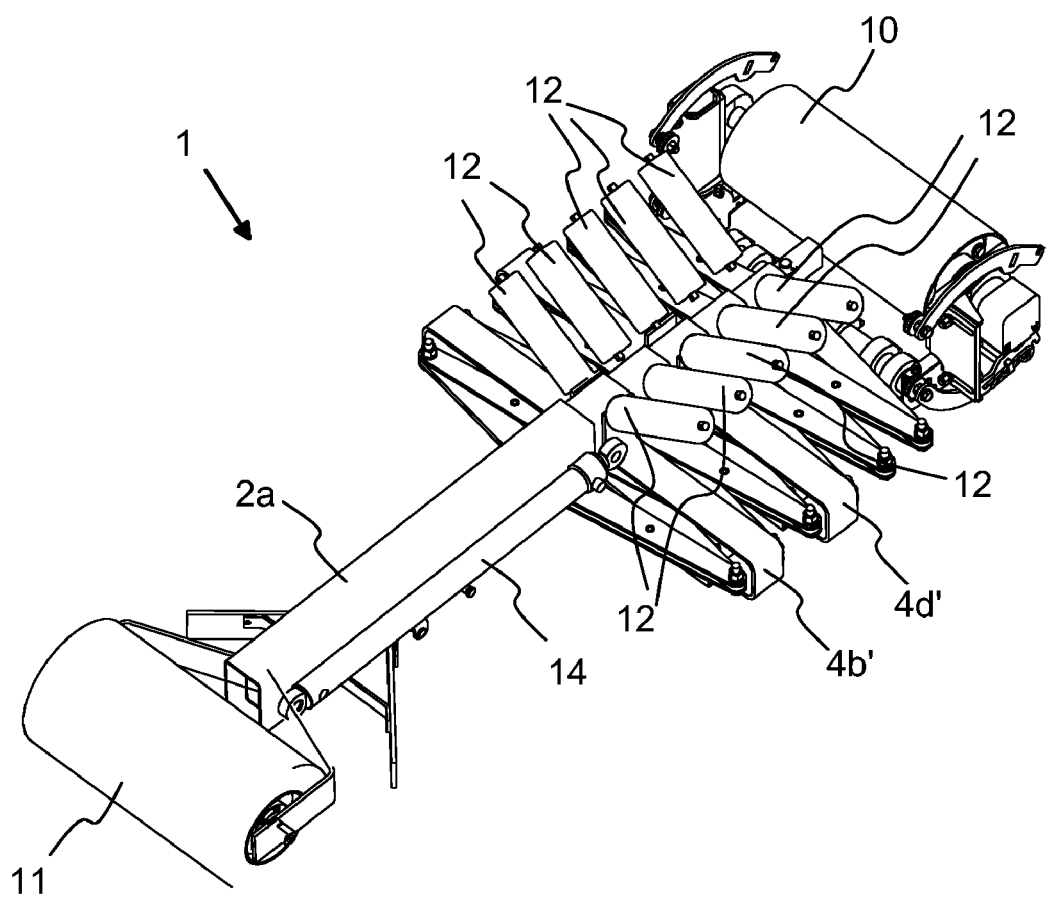
FIG. 12 shows the frame of the belt conveyor of FIG. 10 in its trans-port position, in a perspective view.

At least one frame block 5a-5g is provided with a supporting beam to reinforce the structure of the frame, to support the idlers, and placed in a plane that is substantially parallel with the frame. It is arranged to be substantially perpendicular to the frame pipe in such a way that the center of the length of the supporting beam is placed substantially in alignment with the longitudinal axis of the frame pipe. The supporting beams are connected to the ends of the frame pipes closest to the discharge end D of the conveyor, and their length is determined by the desired width of the conveyor. In FIGS. 10 to 12, supporting beams 4b' and 4d' are connected to the frame pipes 2b and 2d of the frame blocks 5b and 5d.

As shown in FIG. 11, the supporting beams 4b' and 4d' consist of a beam 21 that is connected by fastening means 22 bent to shape and connected to the frame pipes 2b and 2d at both ends of the supporting beams. The supporting beam is connected substantially perpendicular to the frame pipe so that the beam 21 is situated under the frame pipe, spaced from it. The fastening means 22 are designed and the supporting beam is placed in relation to the frame pipe in such a way that the lattice mechanism 20 and the respective lever arms 6a-6n are situated in the space between the frame pipe and the supporting beam, and they can extend and collapse in an unobstructed manner. The supporting beam may also consist of a single piece.

The conveyor belt is supported on top of the frame of the conveyor by means of idlers 12 connected to the frame pipes of the frame blocks shown in FIGS. 10 to 12. The idlers rotate freely around their respective axes, and they are connected to the end of the frame pipes closest to the discharge end D of the conveyor. Each frame pipe, except for the frame pipe closest to the discharge end D of the conveyor, comprises two idlers 12. The idlers are connected at one end of their axis to the upper surface of the frame pipes in such a way that they extend diagonally upwards on opposite sides of the frame pipe. If a supporting beam is connected to the frame pipe, the idlers 12 are fixed to extend above the supporting beam.

Naturally, the belt conveyor also comprises a conveyor belt (not shown in the figure) for conveying the material from the feed end F to the discharge end D of the conveyor. The conveyor belt, its operation, and the elements involved in its rotation are substantially identical to those shown in the embodiment of the invention in FIGS. 1 and 2.

For changing the length of the frame 1, i.e. for making it longer and shorter, the frame 1 is provided with an actuator 14, for example a hydraulic cylinder. The hydraulic cylinder 14 is installed in the longitudinal direction of the frame in such a way that the rear end of its cylinder sleeve is mounted to the end beam (not shown in the figure) of the frame block 5a, and the other end 14b, or the end of the piston rod of the hydraulic cylinder, is mounted to the supporting beam 4b' of another frame block 5b. The hydraulic cylinder and its operation are substantially identical to those shown in the embodiment of the invention in FIG. 1. Also, the lattice mechanism 20 formed by the lever arms 6a-6n operates substantially in the same way, when extending and shortening the belt conveyor, as presented in the embodiment of the invention shown in FIGS. 1 to 5.

FIG. 12 shows the frame of the belt conveyor according to the embodiment of the invention of FIG. 10 in the transport position, that is, shortened to be as short as possible. The frame blocks 5a-5g are within each other; that is, the frame pipes 2b-2g belonging to the frame blocks 5b-5g have slid inside the frame pipe 2a of the frame block 5a. The piston arm of the hydraulic cylinder 14 has slid into the cylinder sleeve of the hydraulic cylinder. The lever arms 6a-6n have pivoted in relation to the supporting means and the joints 8a-8l, and the lattice mechanism has collapsed.

Figure 13:
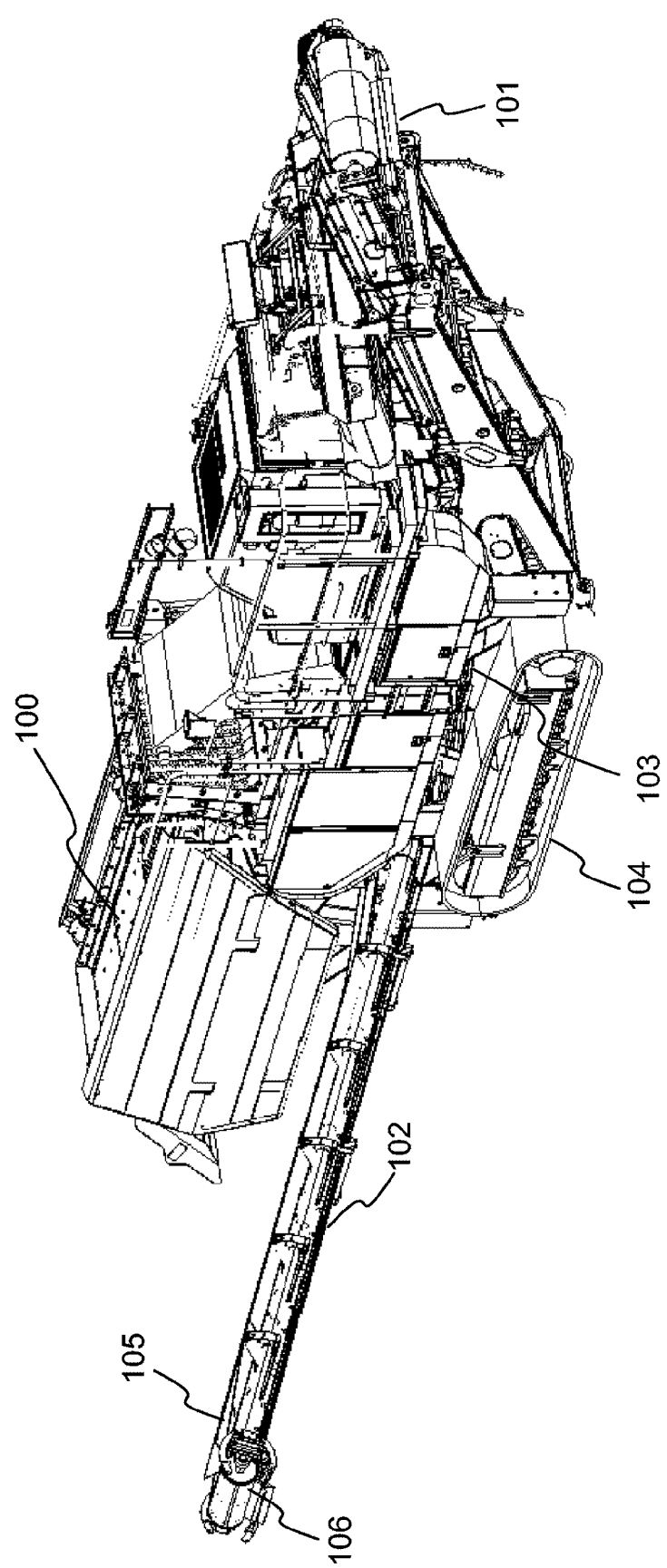
FIG. 13 is a perspective view showing a processing apparatus in which the conveyor according to the invention can be used.

The belt conveyor according to the invention can be mounted in connection with any transfer or processing device, such as a feeder, a crusher, a screen, or a corresponding device for transferring, refining or sorting a material. The material that is transferred farther away from the processing apparatus by the belt conveyor may be any material, such as mineral material. FIG. 13 shows a mobile mineral material processing apparatus in which a processing device, i.e. a screening feeder 100, is mounted on top of a mobile frame 103. The frame of the processing apparatus is equipped with transfer means 104 for moving the processing apparatus from one place to another. The processing apparatus comprises two belt conveyors, of which the first conveyor 101 is mounted at the rear of the processing apparatus and the second conveyor 102 is mounted as a side conveyor on the side of the processing apparatus. The second conveyor 102 is a conveyor according to the invention having a pipe structure and comprising a lattice mechanism, which is in the figure extended to the work position. The belt 105 of the conveyor is also extended, and it extends as an endless loop around the drawing drum 106 and further over the length of the conveyor. The conveyor is mounted to the frame 103 of the processing apparatus in such a way that the first frame block of the feed end of the conveyor extends under the screening feeder 100.

The invention is not intended to be limited to the embodiments presented as examples above, but the invention is intended to be applied widely within the scope of the inventive idea as defined in the appended claims. Conveyors according to the invention can thus be mounted as side conveyors on the side of the processing apparatus, or behind the apparatus, in front of the apparatus, or in any location. Furthermore, the frame pipes, the supporting beams and the lever arms may thus be made of any sufficiently strong metal, such as steel. Also composite materials may be used, if desired. Advantageously, the frame pipes have an annular cross-section, but the invention can also be implemented by using frame pipes of other types. It is also possible to use slide pipes chamfered to shape as the frame pipes. Moreover, the invention is not limited to any embodiment of articulation between the lever arms or between the lever arms and the supporting beams, but the joints may be implemented in many generally known ways.

The frame blocks 5a-5g of the frame of the conveyor may also be arranged in such a way that the diameter of the frame pipes of the successive frame blocks diminishes from the discharge end D of the conveyor towards the feed end F of the conveyor. In this case, the frame pipes with the largest diameter are at the discharge end D of the conveyor.

The drawing drum 10 may also be placed at the feed end F of the conveyor. In this case, the tilting drum 11 is placed at the discharge end D of the conveyor.

The invention claimed is:

1. A belt conveyor, which belt conveyor comprises
a telescopic frame, comprising frame blocks which are installed to each other in a slidable manner and comprise at least one frame pipe, wherein at least one frame block comprises a supporting beam connected to at least one frame pipe,
an endless conveyor belt for transferring material from the feed end to the discharge end of the conveyor,
several idlers connected to the frame for supporting the conveyor belt,
a drawing drum and a tilting drum, via which drums the conveyor belt is arranged to pass,
an actuator connected to the frame for changing the length of the frame,
wherein the frame further comprises
a lattice mechanism pivotably mounted to the frame blocks, the lattice mechanism comprising several lever arms which are connected to the frame blocks in such a way that to each frame block two lever arms are pivotally connected and the lattice mechanism is arranged to effect a change in the length of the belt conveyor as a result of the operation of the actuator.

2. The belt conveyor according to claim 1, wherein the frame blocks consist of two frame pipes having an equal diameter and placed in parallel, and a supporting beam connected at its both ends to the frame.

3. The belt conveyor according to claim 1, wherein the frame blocks are mounted one after another in such a way that at least one frame pipe belonging to a first frame block and having a smaller diameter is arranged to slide inside a frame pipe having a larger diameter and belonging to a second frame block.

4. The belt conveyor according to claim 1, wherein the supporting beam is connected to that end of the frame pipe which is closest to the discharge end of the conveyor.

5. The belt conveyor according to claim 2, wherein the supporting beam is connected to substantially the same location in the length of the frame pipes.

6. The belt conveyor according to claim 1, wherein the two lever arms are arranged to move in a scissors-like manner.

7. The belt conveyor according to claim 6, wherein the lever arms are pivotally connected substantially at the center of their length to the frame pipe.

8. The belt conveyor according to claim 1, wherein for extending the belt conveyor from the transport position to the work position, the second frame block is arranged to slide out of the first frame block, and the lattice mechanism is arranged to extend.

9. The belt conveyor according to claim 1, wherein for shortening the belt conveyor from the work position to the transport position, the second frame block is arranged to slide into the first frame block and the lattice mechanism is arranged to collapse.

10. The belt conveyor according to claim 1, wherein the frame pipes have a substantially annular cross-section.

11. The belt conveyor according to claim 1, wherein the actuator is a hydraulic cylinder, a screw hoist, or an actuator with a gear, chain or cable transmission.

12. A processing apparatus comprising a processing device for processing a material and a belt conveyor for transferring the processed material a distance away from the processing device, which belt conveyor comprises
a telescopic frame, comprising frame blocks which are installed to each other in a slidable manner and comprise at least one frame pipe, wherein at least one frame block comprises a supporting beam connected to at least one frame pipe,
an endless conveyor belt for transferring a material from the feed end to the discharge end of the conveyor,
several idlers connected to the frame for supporting the conveyor belt,
a drawing drum and a tilting drum, via which drums the conveyor belt is arranged to run,
an actuator connected to the frame for changing the length of the frame,
wherein the frame further comprises
a lattice mechanism pivotably mounted to the frame blocks, the lattice mechanism comprising several lever arms which are connected to the frame blocks in such a way that to each frame block two lever arms are pivotally connected and the lattice mechanism is arranged to effect a change in the length of the belt conveyor as a result of the operation of the actuator.

13. The processing apparatus according to claim 12, wherein the frame blocks consist of two frame pipes having an equal diameter and placed in parallel, and a supporting beam connected at its both ends to the frame pipes.

14. The processing apparatus according to claim 12, wherein the frame blocks are mounted one after another in such a way that at least one frame pipe belonging to the first frame block and having a smaller diameter is arranged to slide inside a frame pipe having a larger diameter and belonging to the second frame block.

15. The processing apparatus according to claim 12, wherein the supporting beam is connected to that end of the frame pipe which is closest to the discharge end of the conveyor.

16. The processing apparatus according to claim 12, wherein the two lever arms are arranged to move in a scissors-like manner.

17. The processing apparatus according to claim 16, wherein the lever arms are connected at the center of their length to the frame pipe.

18. The processing apparatus according to claim 12, wherein for extending the belt conveyor from the transport position to the work position, the second frame block is arranged to slide out of the first frame block and the lattice mechanism is arranged to extend.

19. The processing apparatus according to claim 12, wherein for shortening the belt conveyor from the work position to the transport position, the second frame block is arranged to slide into the first frame block, and the lattice mechanism is arranged to collapse.

20. The processing apparatus according to claim 12, wherein the frame pipes have a substantially annular cross-section.

21. The processing apparatus according to claim 12, wherein the actuator is a hydraulic cylinder, a screw hoist, or an actuator with a gear, chain or cable transmission.

22. The processing apparatus according to claim 12, wherein the frame of the processing apparatus is provided with transfer means for moving the processing apparatus.

23. The processing apparatus according to claim 22, wherein the transfer means is one of the following: runners, wheels or tracks.

24. The processing apparatus according to claim 12, wherein the processing apparatus is a mineral material processing apparatus.

25. The processing apparatus according to claim 24, wherein the processing apparatus comprises at least one belt conveyor and at least one processing device which is one of the following: a screen, a crusher, or a feeder.

* * * * *